United States Patent [19]

Crosby et al.

[11] Patent Number: 4,849,469

[45] Date of Patent: * Jul. 18, 1989

[54] VOID CONTROL IN THERMOPLASTICS CONTAINING SILICONE INTERPENETRATING POLYMER NETWORKS

[75] Inventors: Jane M. Crosby, Wilmington, Del.; MaryGail K. Hutchins, Philadelphia; Susan K. Ward, Phoenixville, both of Pa.

[73] Assignee: ICI Americas Inc., Wilmington, Del.

[ * ] Notice: The portion of the term of this patent subsequent to Sep. 22, 2004 has been disclaimed.

[21] Appl. No.: 99,193

[22] Filed: Sep. 21, 1987

Related U.S. Application Data

[63] Continuation-in-part of Ser. No. 707,121, Feb. 28, 1985, Pat. No. 4,695,602.

[51] Int. Cl.$^4$ .................. C08L 59/00; C08L 69/00; C08K 7/16; C08K 7/04
[52] U.S. Cl. ...................... 524/439; 524/438; 524/400; 524/440; 524/441; 524/500; 524/537; 524/539; 524/540; 524/542; 524/861; 524/862; 524/866; 525/100; 525/104; 525/106; 525/422; 525/425; 525/427; 525/431; 525/426; 525/903

[58] Field of Search ............... 524/439, 538, 500, 537, 524/539, 540, 542, 861, 862, 866, 400, 440, 441; 525/100, 104, 106, 422, 425, 427, 431, 426, 903

[56] References Cited

U.S. PATENT DOCUMENTS

| | | | |
|---|---|---|---|
| 4,500,688 | 2/1985 | Arkles | 525/431 |
| 4,695,602 | 9/1987 | Crosby et al. | 524/439 |
| 4,714,739 | 12/1987 | Arkles | 525/92 |

Primary Examiner—Lewis T. Jacobs
Attorney, Agent, or Firm—Panitch, Schwarze Jacobs and Nadel

[57] ABSTRACT

Thermoplastic compositions and composites are produced which have fewer and smaller voids with more consistent dimensions compared to conventional unreinforced and fiber reinforced thermoplastics. The high modulus thermoplastic contains silicone semi-interpenetrating polymer networks which are formed by vulcanization within the thermoplastic and initiated during melt processing. Parts molded from the compositions are more homogeneous, with evenly distributed voids, thus reducing the possibility of stress fractures. The compositions are particularly useful in the molding in thick cross-section and variable thickness parts and have been found to have increased thermal stability.

15 Claims, No Drawings

VOID CONTROL IN THERMOPLASTICS CONTAINING SILICONE INTERPENETRATING POLYMER NETWORKS

CROSS-REFERENCE TO RELATED APPLICATION

This is a continuation-in-part of copending application Ser. No. 707,121, filed Feb. 28, 1985, for "Fiber Reinforced Thermoplastics Containing Silicone Interpenetrating Polymer Networks", issued Sep. 22, 1987, U.S. Pat. No. 4,695,602.

FIELD OF THE INVENTION

The present invention relates to fiber reinforced and unreinforced thermoplastics which are modified to control void formation. More particularly, the invention relates to unreinforced and fiber reinforced thermoplastic composites modified with silicone interpenetrating polymer networks.

BACKGROUND OF THE INVENTION

Formation of voids while injection molding and extruding profiles of thermoplastic composites into thick sections and variable thickness parts has been observed for many years. Voids will be formed because the melted composite adjacent the wall of the mold or on the outside of the extrusion solidifies first and permits the inner hot material to shrink towards the outside leaving bubbles in the middle. The concentration of voids in one particular section of a part creates stress and can lead to premature part failure.

In the past several years, Petrarch Systems Inc. of Bristol, Pa. has developed a new class of melt processable thermoplastics which contain silicone interpenetrating polymer networks (IPN's). These compositions are sometimes referred to as semi-interpenetrating polymer networks (pseudo- or semi- IPN's) since only the silicone component is vulcanized or cross-linked in the thermoplastic matrix. The interpenetrating polymer network is formed by vulcanizing a hydride functional silicone group and a polymer containing at least one unsaturated group, preferably a vinyl group, during normal thermoplastic melt processing. See U.S. Pat. No. 4,500,688 and U.S. Pat. No. 4,714,739 of Barry C. Arkles.

The pseudo- or semi-IPN's have the advantages of exhibiting surface and di-electric properties which approach those of silicones and mechanical properties which approach those of the thermoplastic matrix. In many cases, properties such as wear, lubricity and heat and abrasion resistance of the thermoplastics are improved. While this technology was originally developed in polyurethane systems, it has been extended to other thermoplastic elastomers and engineering thermoplastics. For example, U.S. Pat. No. 4,714,739 of Petrarch Systems Inc. discloses that polyamide (nylon) and polyester engineering thermoplastics have been formulated into materials which appear to be particularly well suited for gear and bearing applications, with the heat distortion temperature of nylon 6,6 being increased by the incorporation of 5 wt % silicone IPN.

However, the major uses of silicone IPN's have still been in the modification of lower modulus thermoplastics, particularly elastomers. To applicant's knowledge, the silicone IPN's have not been used or recognized to control void formation of high modulus thermoplastic materials, i.e., thermoplastic materials which in the unfilled state have a flexural modulus greater than 90,000 psi, as measured by ASTM D790.

BRIEF SUMMARY OF THE INVENTION

The compositions of the present invention are melt processable, fiber reinforced or unreinforced, high modulus (unfilled flexural modulus greater than 90,000 psi) thermoplastics which contain a silicone component which will form semi-interpenetrating polymer networks within the thermoplastic matrix. The silicone component is vulcanized by the reaction of a hydride-containing silicone, with the vulcanization reaction being initiated during thermoplastic melt processing of the silicone component and thermoplastic matrix. The silicone component comprises about one to twenty weight percent of the total composition, and the hydride group-containing silicone is reacted with a polymer containing at least one unsaturated group, preferably a vinyl group, which may be on a silicone or other polymeric compound.

Molded composites produced from the compositions of the invention have fewer and smaller voids of more consistent dimension compared to conventional unreinforced and fiber reinforced thermoplastics without the silicone IPN's. To the extent that voids are still formed, there is an even distribution of voids throughout the entire section. Parts molded from composites containing IPN's are more homogeneous, thus reducing the possibility of stress fractures. This benefit is particularly useful in thick section and variable thickness parts. Further it has been discovered that the reduction in voids results in increased thermal stability of the IPN-containing composite.

DETAILED DESCRIPTION OF THE PREFERRED EMBODIMENTS

The thermoplastics to which the present invention is directed are generally those of the type which are referred to as engineering plastics, namely plastics with high mechanical properties, including high impact strength, high flexural modulus and high heat distortion temperatures. In general, these engineering materials include the main classes of crystalline thermoplastics (i.e., polyamides (nylons), polyesters, polyolefins, polyacetals and fluoropolymers), as well as polycarbonate (amorphous).

The thermoplastic resins which are used in the present invention many be conveniently referred to as high modulus thermoplastics, i.e., those having a high flexural modulus. As used herein the term "high modulus" refers to a flexural modulus of the unfilled thermoplastic resin greater than 90,000 psi, as measured by ASTM specification No. D790. Of course, the flexural modulus of fiber reinforced high modulus thermoplastics will range to psi's in the hundreds of thousands or millions.

The high modulus thermoplastic resins which may be used as matrix materials in the present invention include, but are not limited to, polyamides, thermoplastic polycarbonates, styrenics (i.e., the styrene plastics family including polystyrene and high modulus copolymers thereof such as styrene-acrylonitrile (SAN), acrylonitrile-styrene-butadiene copolymers (ABS), etc.), polyacetals, polyolefins, polyesters, polysulfones, polyphenylene sulfides, fluoropolymers, (fluorinated ethylene-propylene copolymer (FEP), perfluoroalkoxy tetrafluoroethylene (PFA), ethylene-tetrafluoroethylene (ETFE), polyvinylidene fluoride (PVDF), ethylenechlorotrifluoroethylene (ECTFE), etc.) polyetherimides, polyether ketones (including PEEK and others), polyacrylics polyamide-imides and polyvinyl chloride. These high modulus thermoplastics are to be distinguished from the relatively low modulus thermoplastics (flexural modulus less than 90,000 psi) such as thermoplastic polyurethanes, polyolefin elastomers, polyamide-polyether elastomer base resins, polyester elastomers, etc.

The fibrous reinforcing agents that may be used to reinforce the thermoplastic matrix materials of the present invention include a wide variety of fiber types, including glass, carbon, organic (including aramid and the like), ceramic, boron, metal, and reinforcing mineral fibers, such as processed mineral fibers (PMF). The fiber reinforcement may be present in the compositions and composites of the present invention in amounts of about 5 to 60 weight percent of the compositions depending upon the mechanical properties desired.

The compositions and resulting composites which may be modified according to the present invention may contain filler modifiers (with or without the fiber reinforcement) such as glass beads; particulate minerals (e.g. mica, talc, kaolin, clays); flame retardant additives (e.g. barium sulfate ($BaSO_4$), decabromodiphenylene oxide (DBDO), antimony trioxide ($Sb_2O_3$), aluminum hydroxide ($Al(OH)_3$)); lubricants, such as polytetrafluoroethylene (PTFE), molybdenum disulfide ($MoS_2$) and graphite powder; bismuth oxides; metal powders, such as tungsten powder; carbon powders; aluminum flakes; magnetic powders, such as barium ferrite; etc. The fillers may be present in the compositions and composites of the present invention in amounts of about 0.5 to 40 weight percent of the composition depending upon the particular filler and desired use of the filler.

According to the present invention, thermoplastic resin compositions which are optionally filled and/or reinforced having a high flexural modulus may be advantageously modified to control void formation by incorporating about 1 to 20 weight percent and preferably about 2 to 10 weight percent of a silicone component which forms an interpenetrating polymer network (IPN) in the thermoplastic matrix. The formation of such pseudo- or semi-IPN's of silicone in thermoplastic matrices is described in detail in U.S. Pat. No. 4,500,688 issued Feb. 19, 1985 to Barry C. Arkles for "Curable Silicone Containing Compositions and Methods of Making Same" and in U.S. Pat. No. 4,714,739 issued Dec. 22, 1987 to Barry C. Arkles for "Curable Silicone Semi-Interpenetrating Polymer Networks and Methods of Making Same". The disclosures of that patent and patent application are incorporated herein by reference.

In general, the polymerizing silicone phase is made up of two reactive prepolymers: (1) a polymeric silicone which contains silicone hydride (Si—H) groups and (2) a polymeric component which contains unsaturated groups, preferably vinyl groups. Non-limiting examples of other unsaturated groups that can be employed include allyl and hexenyl. Alternatively, both the hydride and unsaturated group can be part of one polymeric silicone. Still further, the vinyl or other unsaturated group may be on a polymeric silicone compound or on a non-silicone polymer such as a vinyl polymer. These prepolymers are melt mixed with a thermoplastic matrix resin and optionally reinforcing fibers and/or other fillers, in a melt extruder, and the extrudate is pelletized.

A catalyst, generally a platinum complex, is preferably added to the pellets, which are then fed into an injection molding machine or extruder for forming. The invention is not limited to injection molding but can be used for example in extrusion of sheets and profiles, vacuum forming, blow molding, etc. The heat from the forming process triggers a catalyst-induced addition reaction between the hydride and vinyl groups of the reactive prepolymers, which results in the interpenetrating polymer network forming throughout the fiber reinforced thermoplastic composite.

A number of variations of the above are possible, some of which are illustrated in the above patent and pending application. For example, the two reactive prepolymers may be included in separate pellets of the thermoplastic matrix resin, with the catalyst being included in the pellets of one of the prepolymers. Similarly, the reinforcing fibers and other fillers, if present, may be included in either or both types of pellets, but are preferably premixed with the thermoplastic matrix resin. The particular order of mixing the various components, consistent with conventional melt processing techniques is not particularly critical, except that the catalyst if used for the silicone component must be isolated or otherwise maintained in an unreactive state until it is desired to initiate the vulcanization of the silicone component during melt processing (i.e. melt mixing or melt forming).

It has been unexpectedly found that composites formed from the compositions of the present invention have significantly reduced void formation. In particular, as illustrated by the specific, non-limiting examples below, the void diameters may be reduced as much as 50% and are fewer and more consistent in size than voids formed from conventional thermoplastic composites without IPN's. More importantly, there is an even distribution of voids throughout the entire molded part from a resin system that contains a silicone interpenetrating network. Parts molded from compositions of this invention are therefore more homogeneous, thus reducing the possibility of stress fractures.

Although applicants do not wish to be bound by any particular theory as to the reasons for the unexpected reductions in void formation according to the present invention, it is believed that the matrix thermoplastics are, in fact, not "inert" but are greatly affected by the cross-linking process of the silicone IPN. Thus, the polymerizing silicone phase appears to change the morphology of the thermoplastic phase significantly, in both crystalline and amorphous thermoplastics resulting in composites exhibiting reduced void formation.

The greatly reduced void formation obtained by the present invention makes the compositions particularly useful for the molding of thick section and varying thickness parts.

In addition to the reduced void formation and increased homogeneity, compositions of the present invention may exhibit a number of other improved properties, including reduced shrinkage and warpage, reduced wear factors (improved wear resistance), reduced coefficients of friction, enhanced impact strength and increased heat distortion temperature. The cycle time can be significantly reduced by enhanced flow modification and mold release.

In the following specific examples, composites were formed and tested according to the following general method. Compositions of the invention were melt-mixed in a 2½ inch single screw extruder under standard conditions for the matrix resin. Three inch diameter ⅛ inch thick edge-gated disks and ¼ inch Izod impact bars were injection molded under standard conditions for the matrix resin. The parts were fractured and the fracture surfaces observed under a scanning electron microscope (SEM). Micrographs were taken of different sections of the part and analyzed on a video image display system (VIDS). TGA, DSC, specific gravity and ashing tests were completed on different areas of the fracture surface cross sections.

EXAMPLE 1

Nylon 6,6 composites were prepared and tested as described above. Monsanto Vydyne 21 (nylon 6,6) resin was used as the matrix thermoplastic. PPG 3540 ⅛" was used as the glass fiber (GF) reinforcement. The silicone component (IPN) was 20 parts (i.e. 5.7 wt %) polydimethylsiloxane, vinyldimethylsiloxy terminated to 1 part (i.e. 0.29 wt %) polydimethylsiloxane—30% methlyhydrosiloxane copolymer, trimethylsiloxy terminated. The IPN composites were found to contain fewer voids. Voids observed exhibited more consistent dimensions than the control compound which did not contain an IPN (see Table I).

EXAMPLE 2

Polycarbonate composites were prepared and tested as described above. Mobay-Bayer Makrolon CHP-1000 resin was used as the matrix thermoplastic. OCF497 ¼ inch was used as the glass fiber reinforcement. The silicone component was 20 parts (i.e. 5.7 wt %) polydimethylsiloxane, vinyldimethylsiloxy terminated to 1 part (i.e. 0.29 wt %) polydimethylsiloxane—30% methylhydrosiloxane copolymer, trimethylsiloxy terminated. The IPN composites were found to have fewer voids with a more consistent perimeter throughout the section. This is in sharp contrast to the control compound which did not contain IPN.

The voiding problem in the control compound (30% glass reinforced polycarbonate) was significant enough to result in measurable differences in specific gravities between the interior and the skin regions of the part cross-section. This variation in specific gravity was not observed in the IPN samples. The TGA analysis also demonstrated a variation in the thermal stability between the interior and skin samples in the non-IPN product. The interior samples which also contained the largest voids decomposed at a lower temperature than the IPN moldings (Table II).

EXAMPLE 3

Polycarbonate compositions without glass fiber reinforcement were prepared and tested as described above. The impact bars of composites containing polycarbonate with 6 wt % IPN had smaller voids (210u) compared to a composite without IPN which had large voids with inconsistent diameters (48–500u).

It will be recognized by those skilled in the art that changes may be made to the above-described embodiments of the invention without departing from the broad inventive concepts thereof. It is understood, therefore, that this invention is not limited to the particular embodiments disclosed, but it is intended to cover all modifications which are within the scope and spirit of the invention as defined by the appended claims.

TABLE I

VIDS Analysis of Voids in 3 × 3 × ⅛ Inch Disks (.015μ)

| Sample | Part Section | Field (μ) | # of Voids | Average Void Perimeter (μ) | Average Void Long Dimension (μ) |
|---|---|---|---|---|---|
| Nylon 6,6 with 30% GF | Skin | $1.048 \times 10^7$ | 38 | 445 ± 106 | 162 ± 33 |
| Nylon 6,6 with 30% GF | Interior | $1.086 \times 10^7$ | 110 | 573 ± 154 | 204 ± 53 |
| Nylon 6,6 with 30% GF and 5% IPN | Skin | $9.5 \times 10^6$ | 45 | 177 ± 40 | 68 ± 18 |
| Nylon 6,6 with 30% GF and 5% IPN | Interior | $9.69 \times 10^6$ | 56 | 242 ± 70 | 91 ± 27 |

TABLE II

VIDS Analysis of Voids in 3 × 3 × ⅛ Inch Disks (.015μ)

| Sample | Part Section | Field (μ) | # of Voids | Average Void Perimeter (μ) | Average Void Long Dimension (μ) | Specific Gravity | Temp (°C.) 2% Weight |
|---|---|---|---|---|---|---|---|
| Polycarbonate with 30% GF | Skin | $2.7 \times 10^7$ | 59 | 757 ± 134 | 272 ± 46 | 1.432 | 470 |
| Polycarbonate with 30% GF | Interior | $2.4 \times 10^7$ | 34 | 1116 | 398 | 1.127 | 415 |
| Polycarbonate with 30% GF and 6% IPN | Skin | $1.3 \times 10^7$ | 15 | 471 ± 141 | 175 ± 47 | 1.234 | 445 |
| Polycarbonate with 30% GF and 6% IPN | Interior | $2.4 \times 10^7$ | 34 | 495 ± 164 | 191 ± 61 | 1.278 | 442 |

We claim:

1. A method of molding high tolerance, thin walled, variable thickness or thick cross-section parts with reduced void formation with a thermoplastic molding resin having an unfilled flexural modulus greater than 90,000 psi comprising adding to said thermoplastic resin prior to or during thermoplastic melt processing a silicone component which will be vulcanized by the reaction of a hydride-containing silicone within said thermoplastic resin to form a silicone semi-interpenetrating polymer network, initiating the vulcanization of said silicone component by thermoplastic melt processing of said component within said thermoplastic resin, and molding said resin into a part.

2. A method according to claim 1 wherein said thermoplastic resin is selected from the group consisting of polyamides, polycarbonates, polystyrene, styrene-acrylonitrile copolymers, acrylonitrile-styrene-butadiene copolymers, polyacetals, polyolefins, polyesters, polysulfones, polyphenylene sulfides, fluoropolymers, polyetherimides, polyether ketones, polyacrylics, polyamide-imides, and polyvinyl chloride.

3. A method according to claim 1 wherein said resin contains a filler selected from the group consisting of glass beads, particulate minerals, flame retardant additives, lubricants, bismuth salts, metal powders and magnetic powders, carbon powders, aluminum flakes.

4. A method according to claim 1 wherein said network comprises about 1 to 20 weight percent of the total composition.

5. A method according to claim 1 wherein said network comprises the reaction product of a polymeric hydride group-containing silicone and a polymer containing at least one unsaturated group.

6. A method according to claim 5 including a catalyst to catalyze the reaction of said silicone and said polymer.

7. A method according to claim 6 wherein said catalyst is a platinum catalyst.

8. A method according to claim 1 wherein said melt processing includes injection molding.

9. A method according to claim 1 wherein said melt processing includes sheet extrusion.

10. A method according to claim 1 wherein said melt processing includes profile extrusion.

11. A method according to claim 1 wherein said melt processing includes blow molding.

12. A method according to claim 1 wherein said melt processing includes vacuum forming.

13. A molded part produced according to the method of claim 1 wherein said voids are small and evenly distributed.

14. A thick cross-section part produced according to the method of claim 1.

15. A variable thickness part produced according to the method of claim 1.

* * * * *